Inventor
Peter D. Ballennie
By
Attorney

Sept. 21, 1971  P. D. BALLENNIE  3,606,740
HIGH EFFICIENCY AIR FILTER
Filed June 5, 1969  2 Sheets-Sheet 2
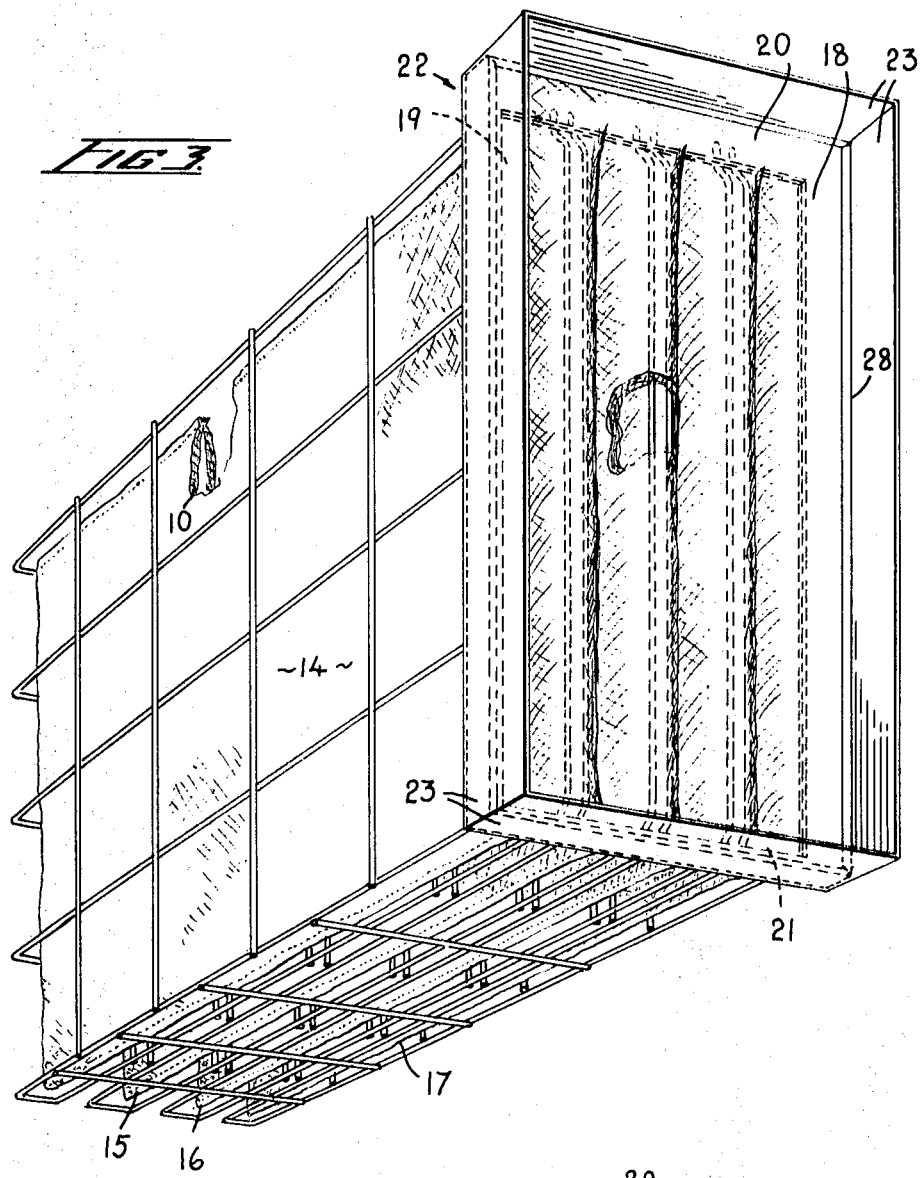
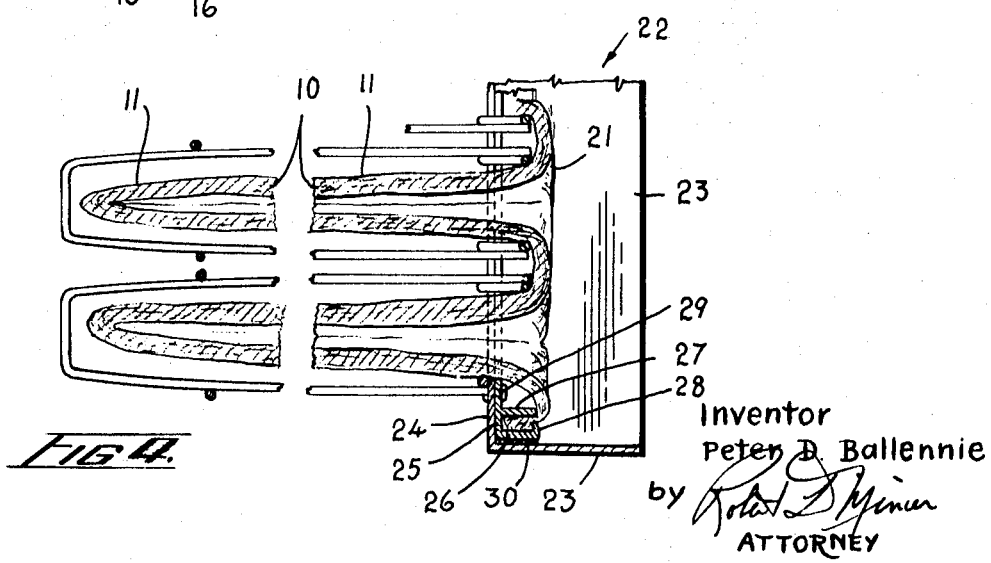
Inventor
Peter D. Ballennie
by
ATTORNEY 3,606,740
HIGH EFFICIENCY AIR FILTER
Peter Donald Ballennie, deceased, late of Toronto, Ontario, Canada, by Eileen Margaret Ballennie, executrix, Toronto, Ontario, Canada, assignor to Johnson & Johnson Limited, Montreal, Quebec, Canada
Filed June 5, 1969, Ser. No. 830,885
Claims priority, application Canada, Oct. 3, 1969, 31,541
Int. Cl. B01d 46/02
U.S. Cl. 55—500                                                    1 Claim

ABSTRACT OF THE DISCLOSURE

An air filter for an air filtering system in which the air filter medium of micro-fibres is covered on both sides with a continuous porous non-woven cover, the medium and cover being folded over upon itself to form a plurality of side-by-side socks which open outwardly in the same direction to form the air inlet, the longitudinal marginal edges of the medium and cover forming each sock being sewn together and placed adjacent the air inlet to form a continuous rectangular air frame allowance around said air inlet.

---

This invention relates to an industrial air filtering system and in particular to an air filter cartridge having new and novel features relating to an improved construction and an improved manner of sealing the cartridge in its supporting frame to prevent air leakage.

The air filter of the present invention is of the "sock style air filter" which are inflated and held in position by the air flow or alternatively are supported and protected by a wire basket frame.

Heretofore, the sock-style air filters have been constructed in a manner that exposes the microfibres to the air flow and, as the air flow is usually of relatively high velocity, peeling of the air filter media takes place, such peeling reducing the efficiency of the filter.

A further disadvantage of the prior art filters was that they were not self-sealing and relied on a pre-filter for sealing. A still further disadvantage of the air filters presently in use was the difficulty of sealing the filter to the frame.

The present invention overcomes the foregoing and other disadvantages by eliminating peeling of the air filter media when in use; by providing positive strength to the cartridge when the filter is overloaded; by providing a self-sealing filter which does not rely on a brief filter for sealing and providing an air filter seal between the filter cartridge and the frame.

The air filter cartridge of the present invention comprises a continuous filter medium of microfibres, a continuous porous non-woven cover on both sides of the filter medium, said medium and cover being folded over upon itself to form a plurality of side-by-side socks all opening outwardly in the same direction, to form an air inlet, the longitudinal marginal edges of the medium and the cover forming each sock being sewn together and pleated adjacent said air inlet to form a continuous rectangular frame allowance around said air inlet.

The construction and manner of use of the present invention is described in the following specification and illustrated in the accompanying drawings in which:

FIG. 3 is a perspective view showing the medium folded as hereinafter described and mounted in a supporting frame; and FIG. 4 is a vertical cross section taken lengthwise of the filter and supporting frame work as shown in FIG. 3.

Figure 1:
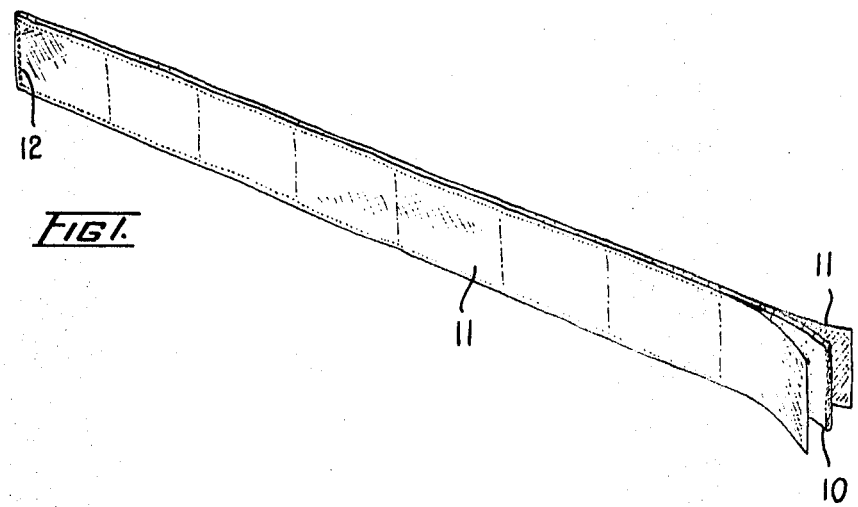
FIG. 1 is a perspective view of the continuous filter medium of the present invention.
Figure 2:
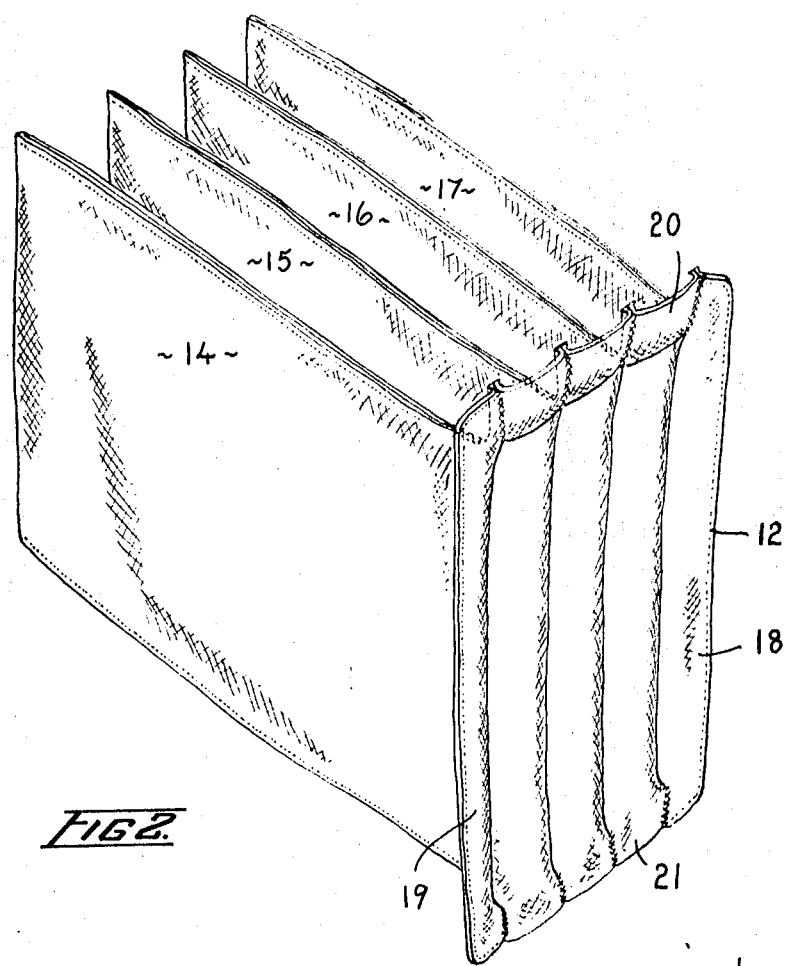
FIG. 2 is a perspective view of the filter medium folded to form pockets.

Referring first to FIGS. 1 and 2, the filter medium comprises a substantially long center portion 10 of micro-fibres covered by a continuous porous non-woven cover 11 which covers both sides of the central portion 10 and both ends. The longitudinal edges of the cover 11 and the central portion 10 are sewn together to form a unitary structure with the microfibres completely enclosed within the porous non-woven cover 11. In addition to sewing each end together, a second stitching is performed inwardly of each end as indicated at 12 in FIG. 1 to provide a portion of the frame allowance to be hereinafter described.

The completed filter medium shown in FIG. 1 is then folded over upon itself as shown in FIGS. 2 and 3 to form four socks 14, 15, 16, and 17. The folding is accomplished by draping the medium over a suitable form starting from the center so that the socks 15, 16 are first formed and ending with the ends at the outside.

The longitudinal edges of the filter medium forming each pocket are then sewn together, the open ends of the socks being completed by a pleat stitch to form a frame allowance complemental to the frame allowance previously mentioned. The frame allowances formed at the ends of the filter medium are indicated by the numerals 18, 19 and the frame allowance formed by the pleating are indicated by the numerals 20, 21. It will thus be seen that the frame allowances 18, 19, 20 and 21 form a continuous rectangular membrane completely surrounding the inlet, which membrane is used for attaching the completed filter cartridge to an air filter frame which will now be described.

The support for the air filter cartridge comprises a rectangular air filter frame indicated by the number 22 having upright sides 23 formed with an inwardly projecting flange 24. This results in a frame of substantially L-cross section. Mounted in the angle formed by the flange 24 and upright 23 is an air filter seal defined by a base 25, a rigid wall 26, a resilient wall 27 and a finger 28 formed integrally with the rigid wall and sloping downwardly toward the resilient wall, the finger stopping short of the resilient all to form a gap through which the frame allowance previously described is inserted and gripped between the finger and the resilient wall. This structure forms a channel for receiving the frame allowance previously referred to. In the present construction the seal is provided with a mounting flange 29 formed integrally with and as an extension of the base whereby the filter seal is secured to the frame. An air tight seal between the upright wall 23 and the rigid wall 26 is formed by a rubbery composition 30 which in the present instance is silicon rubber.

The air filter cartridge is installed in the filter frame by pushing the frame allowance down into the channel past the finger 28. This forms an air tight seal with the frame the finger 28 holding the frame allowance firmly in place.

What is claimed is:

1. An air filter comprising a continuous filter medium of micro-fibers, a continuous porous nonwoven cover on both sides of the filter medium, said medium and said cover being folded over upon itself to form a plurality of side-by-side socks, each sock comprising a folded edge at one end and an open end disposed opposite said folded edge, said folded edge and open end being connected by a pair of longitudinal marginal edges of the medium and the cover extending along the top of said sock and a pair of longitudinal marginal edges of the medium and the cover extending along the bottom of said sock, all of the open ends of said socks being disposed in the same direction to form an air-inlet, the pair of longitudinal edges of the medium and cover extending along the top of each sock being sewn together and having a sewn pleat adjacent said air-inlet, and the pair of longitudinal marginal edges of the medium and cover extending along the bottom of each sock being sewn together and having a sewn pleat adjacent said air-inlet, to form a continuous, rectangular, unitary frame allowance around the entire perimeter of said air-inlet, said frame allowance being integral with said socks whereby a unitary air filter cartridge of said socks and said frame allowance is formed and an L-shaped cross-section rectangular air filter frame having an inwardly extending peripheral flange defining a central opening and means mounted on said frame for removably securing said frame allowance of said air filter cartridge to said frame with an air-tight seal between the frame and said frame allowance comprising a rectangular second frame having a substantially U-shaped channel connected in end-to-end relationship forming a pocket for receiving said frame allowance, said channel being defined by a base, a rigid peripheral outer side wall and a resilient peripheral inner side wall in spaced apart relationship, a rigid finger formed integrally with the rigid wall, said finger sloping downwardly toward the resilient wall, and having a free end stopping short of the resilient wall to form a gap into which the frame allowance extends and is gripped between the finger and the resilient wall, and a mounting flange formed integrally with and as an extension of the base fixed to said inwardly extending peripheral flange.

References Cited

UNITED STATES PATENTS

| | | | |
|---|---|---|---|
| 1,779,458 | 10/1930 | Annis | 55—341 |
| 3,208,205 | 9/1965 | Harms et al. | 55—487X |
| 3,217,472 | 11/1965 | Babbitt et al. | 55—484X |
| 3,373,546 | 3/1968 | Setnan | 55—511X |
| 3,400,519 | 9/1968 | Korn et al. | 55—511X |
| 3,422,602 | 1/1969 | Janson | 55—381X |
| 3,273,321 | 9/1966 | Bauder et al. | 55—499 |
| 3,470,680 | 10/1969 | Avera | 55—500 |
| 3,505,795 | 4/1970 | Wurtenberg | 55—500 |
| 3,490,211 | 1/1970 | Cartier | 55—257X |

OTHER REFERENCES

Adhesive materials—Their Properties and Usage, Foster, 1964, p. 38, Table 1.

FRANK W. LUTTER, Primary Examiner

B. NOZICK, Assistant Examiner

U.S. Cl. X.R.

55—501, 502, 527